(12) United States Patent
Bjorkman et al.

(10) Patent No.: US 10,997,564 B2
(45) Date of Patent: May 4, 2021

(54) ELECTRONIC CHANGE PLANNING MANAGER

(71) Applicant: TARGET BRANDS, INC., Minneapolis, MN (US)

(72) Inventors: Jonathan Bjorkman, North Oaks, MN (US); Daniel Johnson, Elk River, MN (US)

(73) Assignee: Target Brands, Inc., Minneapolis, MN (US)

( * ) Notice: Subject to any disclaimer, the term of this patent is extended or adjusted under 35 U.S.C. 154(b) by 206 days.

(21) Appl. No.: 15/921,315

(22) Filed: Mar. 14, 2018

(65) Prior Publication Data

US 2018/0268374 A1 Sep. 20, 2018

Related U.S. Application Data

(60) Provisional application No. 62/471,189, filed on Mar. 14, 2017.

(51) Int. Cl.
*G06Q 10/10* (2012.01)

(52) U.S. Cl.
CPC ................................. *G06Q 10/1093* (2013.01)

(58) Field of Classification Search
None
See application file for complete search history.

(56) References Cited

U.S. PATENT DOCUMENTS

| | | | | |
|---|---|---|---|---|
| 6,785,868 B1* | 8/2004 | Raff | ...................... | G06Q 10/109 707/999.01 |
| 8,074,175 B2* | 12/2011 | Brush | .................. | G06Q 10/109 715/751 |
| 9,864,483 B2* | 1/2018 | Sarrazin | ................ | G06F 3/0482 |
| 2007/0168892 A1* | 7/2007 | Brush | .................. | G06Q 10/109 715/751 |
| 2013/0073329 A1* | 3/2013 | Shoham | ................. | G06Q 10/10 705/7.18 |
| 2014/0222857 A1* | 8/2014 | Chen | ...................... | G06F 16/951 707/769 |
| 2015/0143303 A1* | 5/2015 | Sarrazin | ............... | G06Q 10/109 715/854 |
| 2015/0193379 A1* | 7/2015 | Mehta | ..................... | G10L 15/00 704/9 |
| 2016/0342955 A1* | 11/2016 | Brock | ..................... | H04L 67/02 |
| 2018/0121461 A1* | 5/2018 | Natarajan | ........... | G06F 16/1748 |
| 2018/0253709 A1* | 9/2018 | Karro | .................. | G06F 16/1865 |

* cited by examiner

*Primary Examiner* — Patricia H Munson
*Assistant Examiner* — Marjorie Pujols-Cruz
(74) *Attorney, Agent, or Firm* — Hamre, Schumann, Mueller & Larson, P.C.

(57) ABSTRACT

A method to visually represent change conflicts between a plurality of changes within the network of retail stores on a display of a user device is disclosed. One of a change identifier or a store identifier is received from the user device. The user device is instructed to display a change calendar including a plurality of calendar blocks representing changes for one or more of the retail stores. A request to add or modify a change is received from the user device. The user device is instructed to display the change calendar according to the request. One or more of a color coding or an indicator are displayed to indicate whether a conflict is present between the change of the request and one or more of the other changes for the one or more retail stores.

20 Claims, 5 Drawing Sheets

ELECTRONIC CHANGE PLANNING MANAGER

FIELD

This disclosure relates generally to electronic calendar planning and change management. More specifically, this disclosure relates to systems, methods, and graphical user interfaces (GUIs) for electronically managing infrastructure changes such as, but not limited, information technology (IT) planning and change management.

BACKGROUND

An organization such as a retailer may have a network of locations (e.g., retail stores) that are distributed geographically. Some retailers may have a network of retail stores that includes hundreds or even thousands of retail stores located worldwide. The network of retail stores can, for example, include a variety of infrastructure to function. Part of that infrastructure can include a variety of hardware devices (e.g., sales registers, servers, wireless network routers, mobile devices, or the like) and software (e.g., for the sales registers to function, installed on the mobile devices, inventory management, or the like). These hardware devices and the software running thereon may be updated/maintained (e.g., hardware replacement and/or upgrades, software modifications, or the like) to continue to function properly. Often, the ongoing maintenance may be interrelated. For example, software running on a particular mobile device may be updated. Alternatively or additionally, the mobile device itself may be updated and/or replaced. The ongoing maintenance may have interrelationships to ongoing functions at the store. For example, there may be periods of time (e.g., holiday season or the like) during which maintenance is undesirable unless a specific problem arises.

Improved ways to electronically manage these infrastructure changes within the network of retail stores are desirable.

SUMMARY

This disclosure relates generally to electronic calendar planning and change management. More specifically, this disclosure relates to systems, methods, and graphical user interfaces (GUIs) for electronically managing infrastructure changes such as, but not limited, information technology (IT) planning and change management.

An electronic change manager, systems, methods, and graphical user interfaces (GUIs) for electronically managing changes within a network of retail stores is disclosed. The method includes visually representing change conflicts between a plurality of changes within a network of retail stores on a display of a user device. The method includes receiving, from the user device, one of a change identifier or a store identifier. A change calendar is displayed on the user device that includes a plurality of calendar blocks representing changes for one or more of the retail stores. A request to add or modify a change is received from the user device. The change calendar is automatically updated and displayed according to the request. One or more of a color coding or an indicator are displayed indicating whether a conflict is present between the change of the request and one or more of the other changes for the one or more retail stores.

The systems, methods, and graphical user interfaces (GUIs) for electronically managing changes within, for example, a network of retail stores can provide additional clarity regarding a potential impact of an IT change (e.g., a hardware or software modification) to one or more of the plurality of retail stores within the network of retail stores. In an embodiment, the additional clarity can align changes so that the changes are implemented in an appropriate order and at an appropriate time. That is, in an embodiment, the electronic change manager described in this specification can be used to determine whether an intended change to, for example, software on a point-of-sale device (e.g., a cash register) is scheduled at a time when, for example, the point-of-sale device is scheduled to be replaced. As a result, the intended changes can be rescheduled if there is a conflict between one or more intended changes. In an embodiment, the electronic change manager can also be used to, for example, determine whether an intended change might conflict with an activity at the store that is not directly related to an IT change. For example, a scheduled hardware or software change may be prevented during a period of time in which the retail store is scheduled to complete an inventory process as the software change could prevent the employees from being able to complete their inventory tasks.

A system is also disclosed. The system includes a server and a database. The database includes change record information and store information for one or more retail stores in a network of retail stores. The server includes an electronic change manager that makes a graphical user interface (GUI) available for display on a display of a user device via a network. The electronic change manager receives, from the user device, one of a change identifier or a store identifier. The electronic change manager sends instructions to the user device to display a change calendar including a plurality of calendar blocks, the calendar blocks representing changes for one or more retail stores in the network of retail stores. The electronic change manager receives, from the user device, a request to add or modify a change, and automatically updates and sends instructions to the user device to display the change calendar by reconfiguring the plurality of calendar blocks according to the request. One or more of a color coding or an indicator are displayed indicating whether a conflict is present between the change of the request and one or more of the other change records for the one or more retail stores in the network of retail stores.

An electronic change manager interface is also disclosed. The electronic change manager interface includes a computer device that includes one or more processors and one or more non-transitory tangible computer-readable media programmed with program instructions which, when the program instructions are executed, causes the computer device to display an electronic change manager user interface. The electronic change manager user interface includes inputs for completion by a user. The inputs identify one or more retail stores in a network of retail stores for which to display an electronic change calendar. The electronic change calendar includes a plurality of calendar blocks. The calendar blocks represent changes for the one or more retail stores in the network of retail stores. When the inputs are received from the computer device identifying a request to add or modify a change, the electronic change manager user interface is automatically updated and displays the change calendar by reconfiguring the plurality of calendar blocks according to the request.

BRIEF DESCRIPTION OF THE DRAWINGS

References are made to the accompanying drawings that form a part of this disclosure, and which illustrate embodi

Like reference numbers represent like parts throughout.

DETAILED DESCRIPTION

Figure 1:
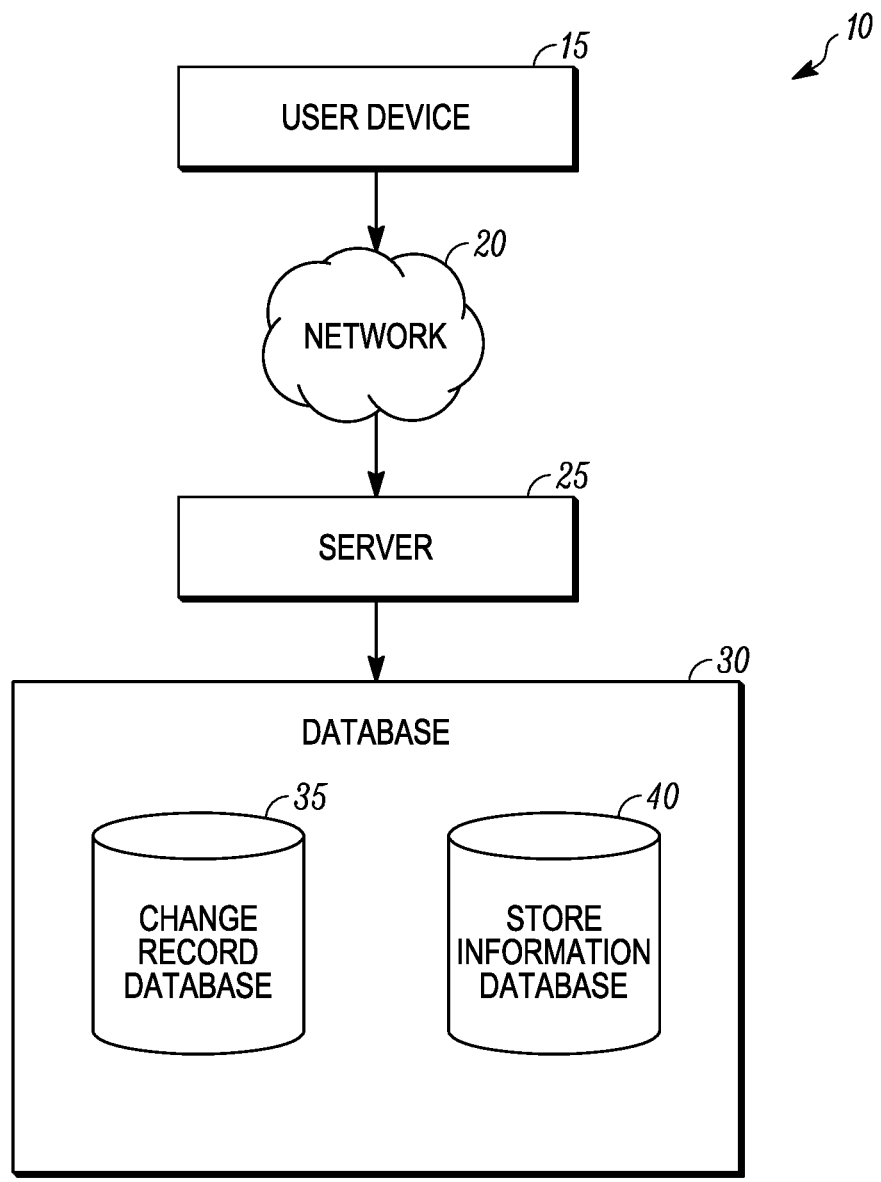
- FIG. 1 is a schematic diagram of a system for implementing the change management system and methods described in this specification, according to an embodiment.

This disclosure relates generally to electronic calendar planning and change management. More specifically, this disclosure relates to systems, methods, and graphical user interfaces (GUIs) for electronically managing infrastructure changes such as, but not limited to, information technology (IT) planning and change management.

The systems, methods, and graphical user interfaces (GUIs) for electronically managing changes within, for example, a network of retail stores can provide additional clarity regarding a potential impact of an IT change (e.g., a hardware or software modification) to one or more of the plurality of retail stores within the network of retail stores. In an embodiment, the additional clarity can align changes so that the changes are implemented in an appropriate order and at an appropriate time. That is, in an embodiment, the electronic change manager described in this specification can be used to determine whether an intended change to, for example, software on a point-of-sale device (e.g., a cash register) is scheduled at a time when, for example, the point-of-sale device is scheduled to be replaced. As a result, the intended changes can be rescheduled if there is a conflict between one or more intended changes. In an embodiment, the electronic change manager can also be used to, for example, determine whether an intended change might conflict with an activity at the store that is not directly related to an IT change. For example, a scheduled software change may be prevented during a period of time in which the retail store is scheduled to complete an inventory process as the software change could prevent the employees from being able to complete their inventory tasks.

The systems, methods, and GUIs are generally described with reference to managing IT changes at the retail stores. It will be appreciated that the systems, methods, and GUIs can also be utilized to manage other types of changes. For example, in an embodiment, the electronic change manager can include information related to scheduling more general infrastructure changes such as, but not limited to, remodeling a retail store, maintenance in a retail store, or the like.

A change, as used in this specification, includes a modification to one or more hardware devices and/or a modification to software running on the one or more hardware devices. Changes are generally discussed with respect to hardware and software that are part of the IT resources at a retail store.

A network of retail stores, as used in this specification, includes a plurality of retail stores owned and/or operated by a retailer. In an embodiment, the network of retail stores can include retail stores that are distributed geographically. In an embodiment, the network of retail stores can include hundreds or thousands of retail stores nationwide or worldwide. The examples described are not intended to be limited to a particular geographical region or to a particular number of retail stores. It will be appreciated that the embodiments described in this specification are applicable to a single retail store in addition to a network of retail stores. In an embodiment, an amount of effort in managing changes and conflicts between changes may be reduced by a relatively larger amount when a number of retail stores is greater than one.

FIG. 1 is a schematic diagram of a system 10 for implementing the systems, methods, and GUIs described in this specification, according to an embodiment. The system 10 can be used to review, add, or modify changes to be made at one or more retail stores within a network of retail stores of a retailer.

The system 10 includes a server 25 in communication with a user device 15 via a network 20. The illustrated embodiment includes a single user device 15 for simplicity of the figure. It will be appreciated that a number of user devices 15 can vary. The server 25 can make the electronic change manager described in this specification available to the user device 15. The server 25 can make the electronic change manager available to the user device 15 via the network 20. In an embodiment, the server 25 can make a graphical user interface (GUI) for managing changes via the electronic change manager described in this specification available to the user device 15.

It will be appreciated that the GUI may be made available by one or more servers that are separate from the server 25. In an embodiment, aspects of the server 25 can be the same as or similar to aspects of the server device 535 shown and described in accordance with FIG. 5 below.

In an embodiment, the network 20 is representative of the Internet. In an embodiment, the network 20 can include, for example, a local area network (LAN), a wide area network (WAN), a wireless network, a cellular data network, or the like. In an embodiment, aspects of the network 20 can be the same as or similar to aspects of the network 540 as shown and described in accordance with FIG. 5 below.

Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user device 15 generally includes a display device and an input device. A GUI for searching the inventory of products available for purchase from the retailer can be displayed on the display device of the user device 15. Examples of the display device for the user device 15 include, but are not limited to, a monitor connected to a PC, a laptop screen, a mobile device screen, a tablet screen, or the like. In an embodiment, aspects of the user device 15 can be the same as, or similar to, aspects of user devices 501 as shown and described in accordance with FIG. 5 below.

The server 25 is in communication with a database 30. The database 30 can include a variety of information related to the network of stores of the retailer, hardware and/or software information, change related information, or the like. For example, in an embodiment, the database 30 can include a change record database 35 and a store information database 40.

The change record database 35 can include, for example, information related to changes to be implemented in one or more retail stores of the network of retail stores. For example, the change record database 35 can include information such as, but not limited to, a type of change to be implemented (e.g., hardware change, software change, or the like); a time at which the change is to be implemented; a store identifier that indicates which store (or stores) are to be impacted by the change; or the like. It will be appreciated that the information included is intended as an example. The change record database 35 can include one or more additional aspects of information related to the changes. For example, in an embodiment, the change record database 35 can include information related to which user has requested the change; which department of the retailer requested the change; or the like. In an embodiment, entries in the change record database 35 can be added, updated, and/or removed via the electronic change manager (e.g., one or more GUIs) made available to the user device via the server 25.

In an embodiment, the change record database 35 may also be accessible from a system that is not associated with the electronic change manager. For example, the electronic change manager can be a simplified user interface which reduces an amount of information available to the user and a separate system can be used to access all information included in the change record database 35. For example, in an embodiment, the change record database 35 may be accessible via the user device 15 by using the electronic change manager. Alternatively or additionally, the change record database 35 may be accessible via the user device 15 by using another program, application, or website, to add, modify, or remove changes. That is, the change record database 35 may be managed via a plurality of interfaces, according to an embodiment.

The store information database 40 can include a variety of information about the network of stores of the retailer. For example, the store information database 40 can include information such as, but not limited to, a store identifier; business hours for the retail stores within the network of retail stores; schedules for various activities at the store such as, but not limited to, maintenance schedules, delivery schedules, inventory schedules, or the like; hours or days during which the stores are busiest (e.g., a period in which changes are made in response to critical issues, but all changes which are not in response to critical issues are not allowed); or the like. The information identified is intended to be an example. It will be appreciated that the particular information can vary.

The database 30 and the corresponding components (change record database 35 and store information database 40) are not intended to reflect a specific database format. The change record database 35 and the store information database 40 are examples. In an embodiment, fewer and/or additional databases can be included in the system 10.

Figure 2:
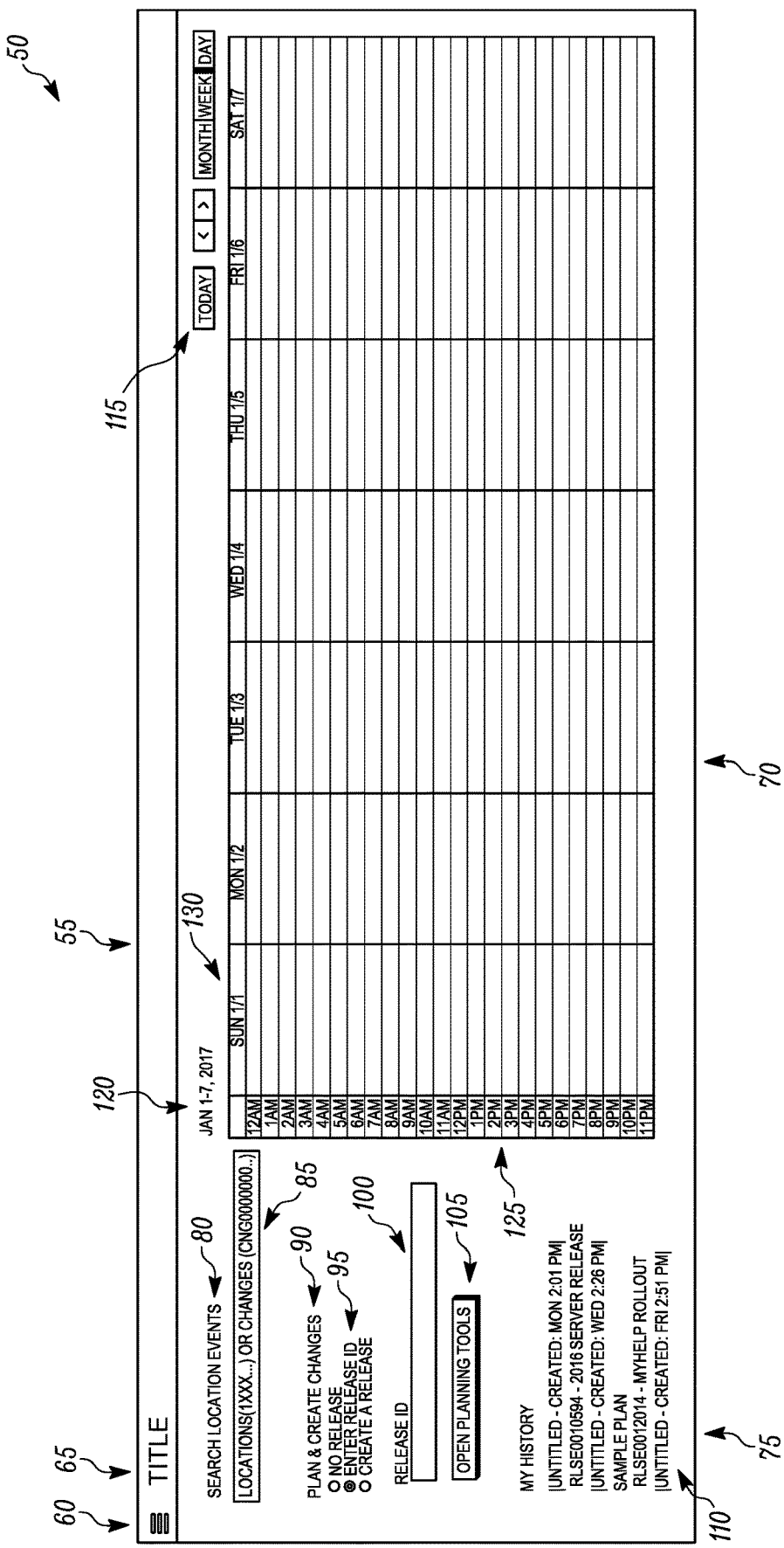
FIG. 2 is a schematic diagram of a GUI for the electronic change manager as described in this specification, according to an embodiment.

FIG. 2 is a schematic diagram of a GUI 50 for the electronic change manager as described in this specification, according to an embodiment. The GUI 50 is an example for the electronic change manager and can include additional or less information than shown in FIG. 2. It will be appreciated that the text in the figure is representative and can be modified.

Depending on a user's role, the user can be given different privileges within the electronic change manager. For example, a manager may be able to add, remove, or modify changes. A user that is not a manager may have reduced privileges and may be able to add or modify changes, but may not be able to remove information. In an embodiment, a group of users (e.g., members of the IT department, or the like) may have a set of privileges that enable adding, removing, or modifying changes. Another group of users (e.g., employees at the retail stores, or the like) may have a set of privileges that enables viewing of the changes without editing privileges. In such an embodiment, the GUI 50 may not include portions shown and described below. Enabling such privileges can, for example, enable users who may be impacted by changes (e.g., retail store employees) to view the changes to see when there may be impacts to the user's store.

The GUI 50 includes a header 55, a change calendar 70, and a change controller 75. The header 55 can include a menu 60 and a GUI label 65. The menu 60 may be a hyperlink and can be an image, as shown, or other text. The hyperlink can be clicked by a user, and in response to being selected, can cause a list of options to be displayed on the GUI 50. The list of options can, for example, include navigational options or the like. In an embodiment, the menu 60 can include navigational options; options to import and/or export a change calendar; text indicating recent actions that have been taken by the user (e.g., user history information); or the like. This user history information can include, for example, a number of actions recently completed by the user. In an embodiment, the actions may be selectable. The GUI label 65 can include, for example, a name of the GUI, a logo or other image, or the like. In an embodiment, the GUI label 65 can be optional.

The GUI 50 also includes the change calendar 70. In the illustrated embodiment, there are no changes shown on the change calendar 70. The illustrated view may be shown, for example, when a user starts the electronic change manager and prior to entering particular location or change information in the change controller 75. The change calendar 70 is shown and described with changes in additional detail with respect to FIGS. 4 and 5 below. The change calendar 70 includes display buttons 115, date header 120, time groupings 125, and day groupings 130. In an embodiment, store information displayed in the change calendar 70 can be displayed according to a local time of the retail store. Accordingly, if the retail store is in a different time zone than the user, the user will see the changes according to the local time at the retail store, not the local time of the user. In an embodiment, the changes may be displayed in a local time of the user, or a local time of a headquarters of the retailer. In an embodiment, the change calendar 70 can be exported to another program in, for example, a spreadsheet format. In an embodiment, this can provide for printing, sharing, or the like.

The display buttons 115 are clickable buttons that when selected cause the change calendar 70 to be displayed in various views. For example, the display buttons 115 can include options for displaying the change calendar 70 in a view in which a particular day is illustrated, in a view in which a particular week is illustrated, or a view in which a particular month is illustrated. The display buttons 115 can, in an embodiment, include one or more additional options such as, but not limited to, scroll buttons which can be selected to cause the change calendar 70 to switch between days, weeks, or months. A button, as used in this specification, is not intended to include a particular structure. A button can generally include an area that is selectable and which can, for example, include a hyperlink or the like to cause a display change to the GUI 50. It will be appreciated that the display buttons 115 can alternatively be implemented as hyperlinks or the like.

The change calendar 70 further includes the date header 120 which reflects a currently displayed date range displayed in the change calendar 70. For example, in the illustrated embodiment, the date range is Jan. 1-7, 2017 and the change calendar 70 shows a week view including the days of January 1 through January 7.

The change calendar 70 further includes the time groupings 125. In the illustrated embodiment, the time groupings 125 include one-hour blocks from 12 am to 11 pm on the displayed days. It will be appreciated that these time groupings 125 are examples. The time groupings 125 can vary within the scope of this disclosure. For example, in an embodiment, the time groupings 125 may be grouped every half hour, every two hours, or the like.

The change calendar 70 further includes the day groupings 130. The day groupings 130 separate the change calendar according to a number of days based on the selected view. It will be appreciated that the time groupings 125 and/or day groupings may not be displayed depending on a selected view.

The GUI 50 also includes the change controller 75. The change controller 75 includes search control 80, change modifier 90, and history display 110. The search control 80 includes an input 85. The input 85 can be, for example, a text box or the like. The search input 85 can be used to search for a particular change if the user knows which change record is sought. Alternatively, the search input 85 can be used to search for a particular store or location. In an embodiment, the search control 80 may be a read-only view on the change calendar 70. That is, the change calendar 70 can display the change(s) or location(s) searched, but the user may be unable to modify the changes shown in the change calendar 70.

Figure 3:
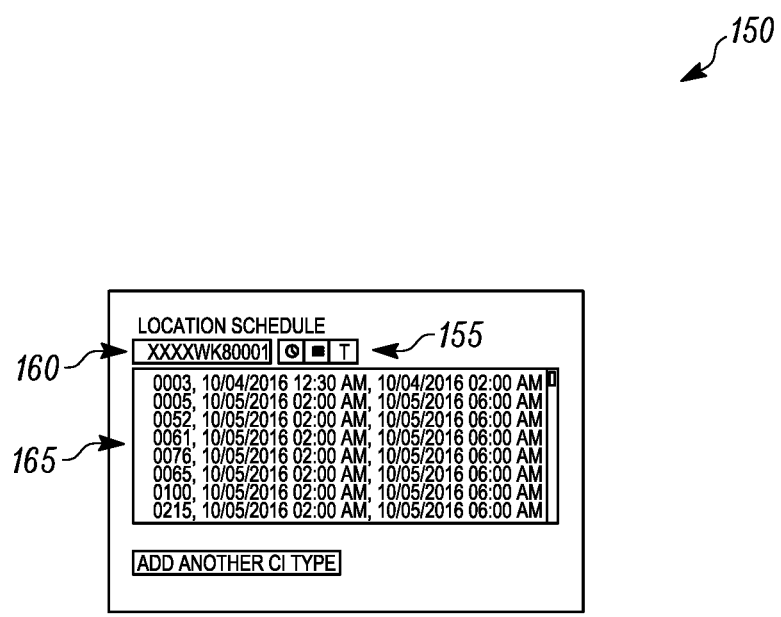
FIG. 3 is a schematic diagram of a location setting GUI of the change record creation GUI, according to an embodiment.

The change modifier 90 includes inputs 95, 100, and a button 105 for beginning submission of one or more changes. The change modifier 90 can provide an editable view of the change calendar 70 for the user. In an embodiment, when the button 105 is selected, the user may be able to begin creating or modifying change information. The button 105, when selected, may enable a different view for the GUI 50, such as a location setting GUI 150 (FIG. 3). The location setting GUI 150 is shown and described in additional detail with respect to FIG. 3 below. A button, as used in this specification, is not intended to include a particular structure. A button can generally include an area that is selectable and which can, for example, include a hyperlink or the like to cause a display change to the GUI 50.

The change modifier 90 can include the input 95 (e.g., the creation criteria selector 95) in which the user may select to connect the change to a current (e.g., existing) release (e.g., a grouping of changes), create a new release, or select to create a change record without associating the change with a release. In an embodiment, the creation criteria selector 95 can, for example, include a radio button or the like in which the user selects one of several options. A radio button, as used in this specification, can generally include an area that is selectable and which can, for example, limit a group of radio buttons so that only a single selection is made. If the user selects to enter a current release or create a new release, then the user can use the input 100 to input a release identifier. In the illustrated embodiment, the input 100 is a text box. It will be appreciated that the input 100 can alternatively be, for example, a dropdown menu or other pre-populated input from which the user can select a release identifier from a listing of release identifiers. In an embodiment, this style of input may depend upon the user selecting to enter a current release identifier.

The change controller 75 further includes the history display 110. The history display 110 can include a listing of recently completed actions. A number of recently completed actions displayed can vary. For example, a most recent five actions can be displayed in the history display 110, in an embodiment. It will be appreciated that the number of recent actions can be fewer than or greater than five. The history display 110 can be optional and may not be displayed in some cases.

FIG. 3 is a schematic diagram of the location setting GUI 150, according to an embodiment. The location setting GUI 150 may be displayed in response to the user selecting the button 105 in the GUI 50 (FIG. 2). The location setting GUI 150 can enable the user to plan out which retail stores (e.g., locations), and which dates, will apply for change records. The location setting GUI 150 includes an entry option menu 155. A user can select how the locations will be entered into the electronic change manager via the entry option menu 155. In an embodiment, the entry option menu 155 can include a series of buttons which, when selected, control the entry method. For example, the user can enter the information by entering a first character into the input 160. In an embodiment, after entering a character, a location list may be displayed for the user. In such an embodiment, the user can then select one or more locations for the change. In an embodiment, the user can import a listing of locations into the input 160. This can, for example, be completed by copying and pasting a listing of locations from another document or program into the input 160. An input 165 shows the various entries that have been input by the user.

Figure 4:
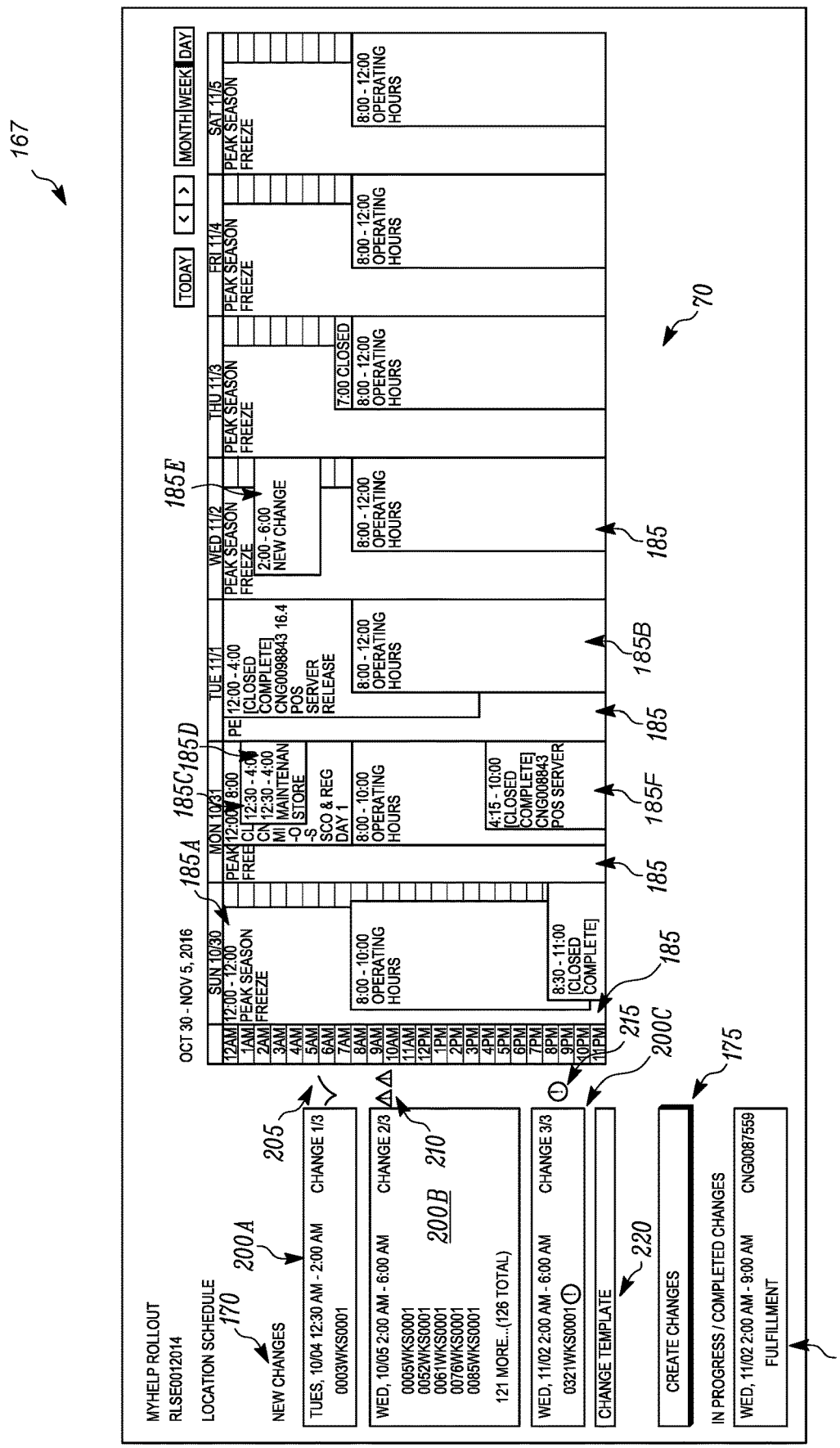
FIG. 4 is a schematic diagram of the change record creation GUI, according to an embodiment.

FIG. 4 is a schematic diagram of the change record creation GUI 167, according to an embodiment. For simplicity, in the illustrated embodiment, the location setting GUI 150 (FIG. 3) is not shown. It will be appreciated that the inputs 160, 165 (FIG. 3), and the entry option menu 155 (FIG. 3) can be included under the "Location Schedule" text of the change record creation GUI 167, according to an embodiment.

The change record creation GUI 167 includes the change calendar 70, a change conflict summary 170, a change commit button 175, and a progress indicator 180. It will be appreciated that the change record creation GUI 167 can include additional aspects. For example, the change record creation GUI 167 can also include the header 55 as shown in FIG. 2. The change calendar 70 includes a plurality of calendar blocks 185. The calendar blocks 185 generally may be representative of a change record or store information. For example, the calendar block 185A includes an identifier "Peak Season Freeze." The calendar block 185A extends through the whole day such that the user can see that changes are intended to be blocked during this period of time. For example, this may be a result of a particularly busy time at the retail store such as, but not limited to, a holiday season, back-to-school time, or the like. The calendar blocks 185 can have different meanings, and may not trigger a conflict when the user is creating a change. For example, calendar block 185B includes an identifier "Operating Hours." Some changes may be independent of a retail store's operating hours. For example, if a change will not impact customers, the change may be permissible during the calendar block 185B. The various calendar blocks 185 can be color coded in an embodiment. This can, for example, enable a user to identify calendar blocks 185 of particular interest simply based on color. In an embodiment, some calendar blocks 185 may be applicable to more than one location. For example, the calendar block 185A can be a freeze for all locations. In such a case, instead of overlaying the calendar block 185A for each store, the electronic change manager may automatically combine duplicate calendar blocks. That is, regardless of whether information is being shown for one store or 400 stores, a single calendar block 185 may be shown for duplicate calendar blocks. In an embodiment, to provide simplified viewing, additional details about a change may be viewable, for example, when the user hovers a cursor over a particular calendar block 185.

The change calendar 70 also shows calendar blocks 185C-185E for changes that the user is attempting to insert. Data in the electronic change manager is persistent. That is, even changes that have already been implemented remain on the change calendar 70. This is shown, for example, in calendar blocks 185F. The changes that have been completed can be color coded in a different color. Further, the changes that have been completed can be labeled as closed, completed, or the like. It will be appreciated that if a storage limit of a database storing the change records (e.g., change record database 35 in FIG. 1) is reached, oldest changes in the change manager may be archived or the like.

Changes entered in the change record creation GUI 167 may be inserted into the change record database 35 (FIG. 1). Prior to selecting the change commit button 170, the change information may be stored in a local memory of the user device 15 on which the change record creation GUI 167 is accessed. In an embodiment, prior to selecting the change commit button 170, the change information may be stored in a storage medium of the server 25. Once the user selects the change commit button 170, the locally or server stored change information may be entered in the change record database 35. A button, as used in this specification, is not intended to include a particular structure. A button can generally include an area that is selectable and which can, for example, include a hyperlink or the like to cause a display change to the GUI 167 or an action by which the server may enter a record in the change record database 35.

As changes are entered in the change record creation GUI 167, the server 25 makes the changes available to other users. That is, if a first user is in process of creating a change, and a second user enters a change, the first user will see the change of the second user if the change was entered for the same store or the same IT devices are impacted. Thus, a user can see in real time or substantially real time what changes will impact a store via the electronic change manager. In an embodiment, substantially real time includes, for example, delays subject to processing and network transmission or the like.

The change conflict summary 170 includes an indication of the changes that have been entered by a user. The illustrated embodiment includes three changes 200A-200C. The change 200A includes an indicator 205 that indicates that the change 200A can be implemented as there are no conflicting changes or events. In the illustrated embodiment, the indicator 205 is a checkmark. It will be appreciated that the checkmark is intended as an example and that the indicator 205 can vary. The change 200B includes several potential conflicts. These are indicated via the indicators 210. The indicators 210 identify that the change 205B has a conflict with a business event (e.g., event at the retail store) or another change (e.g., hardware or software) that is going on in the retail store at the same time. The change 200C includes indicator 215. The indicator 215 is to indicate to the user that the change being entered matches another change for the same retail store. That is, the indicator 215 may inform the user that the change being entered is already within the system.

In an embodiment, to determine whether there is a conflict between a change being entered and a change in the electronic change manager, and select which of the indicators 205, 210, or 215 to display, the server 25 can perform a conflict check. In an embodiment, the conflict check can be performed by determining whether there are changes concurrently scheduled at a location selected by a user. In an embodiment, only a highest priority conflict may be displayed. For example, if a change is scheduled during a freeze period and during an inventory schedule at the retail store, the change may be displayed as conflicting with the freeze period, as there may be a higher priority assigned to this situation.

A user may modify the change information via the change conflict summary 170 or via the change calendar 70. That is, the user can simply move the calendar block 185 including the change to a different time on the change calendar 70. Following such a change, the information in the change conflict summary 170 can be automatically updated. Alternatively or additionally, the user can modify the change information via the change conflict summary 170, and the changes will automatically be reflected on the change calendar 70.

In an embodiment, the user may be able to create the change as a change template for reuse in submitting similar changes. This can, for example, be particularly beneficial when the user is submitting a number of similar changes on a regular basis. To create a change template, the user can select a change template option at 220.

Figure 5:
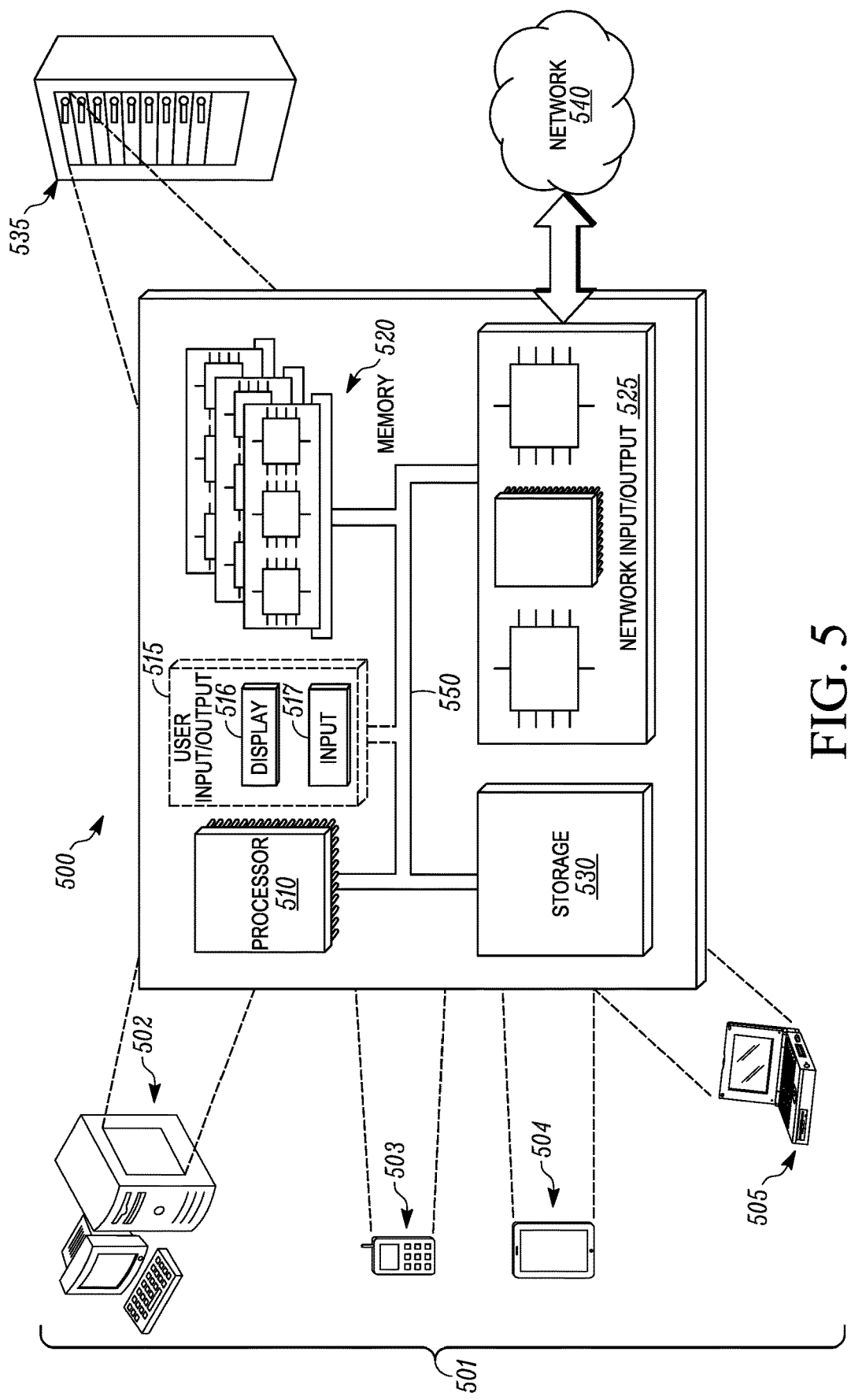
FIG. 5 is a schematic diagram of architecture for a computer device, according to an embodiment.

FIG. 5 is a schematic diagram of architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Aspects:

Aspect 1. A computer-implemented method for visually representing change conflicts between a plurality of change records within a network of retail stores via a graphical user interface (GUI) on a display of a user device, including: via an electronic change manager that is accessible from the user device: receiving, from the user device, one of a change identifier or a store identifier; displaying a change calendar including a plurality of calendar blocks, the calendar blocks representing changes for one or more retail stores in the network of retail stores; receiving, from the user device, a request to add or modify a change; and automatically updating and displaying the change calendar by reconfiguring the plurality of calendar blocks according to the request, wherein one or more of a color coding or an indicator are displayed indicating whether a conflict is present between the change of the request and one or more of the other change records for the one or more retail stores in the network of retail stores.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

What is claimed is:

1. A computer-implemented method for visually representing change conflicts between a plurality of electronic change records within a network of retail stores via a graphical user interface (GUI) on a display of a user device, the method performed by an electronic change manager made available by a server and accessible from the user device, the method comprising the electronic change manager:
    receiving, from the user device, a store identifier, wherein the store identifier indicates one or more retail stores in the network of retail stores to be impacted via the electronic change manager;
    instructing the user device to display a change calendar including a plurality of calendar blocks, the plurality of calendar blocks representing changes for the one or more retail stores in the network of retail stores, based on the store identifier received from the user device;
    receiving, from the user device, a request to add or modify a change, wherein the change includes a modification to one or more hardware devices that is an information technology resource at the one or more retail stores and/or a modification to software running on the one or more hardware devices;
    storing the change into a change record database that includes information related to a type of change being implemented, a time at which the change is being implemented, and the store identifier indicating which of the network of retail stores are to be impacted by the change;
    determining whether there is a conflict between the change and one or more other change records for the one or more retail stores in the network of retail stores by determining whether the change and at least one of the one or more other change records are concurrently scheduled at a location;
    selecting between a no conflict indicator, a conflict indicator, and a matching indicator based on the determination of whether there is a conflict between the change and the one or more other change records, wherein the matching indicator indicates the change matches at least one of the one or more change records;
    automatically updating the change calendar and instructing the user device to display the change calendar by reconfiguring the plurality of calendar blocks according to the request and automatically updating a change conflict summary and instructing the user device to display the change conflict summary including the change with at least one of the no conflict indicator, the conflict indicator, and the matching indicator, wherein the change calendar and the change conflict summary are concurrently displayed on the user device with the change conflict summary being displayed adjacent to the change calendar; and
    automatically updating the change calendar displayed on the user device based on receiving a modification of the change in the change conflict summary, and automatically updating the change conflict summary displayed on the user device based on receiving the modification of the change in the change calendar;
    implementing the change in an appropriate order and at an appropriate time based on the updated change calendar to:
        the one or more hardware devices that is an information technology resource at the one or more retail stores and/or
        to the software running on the one or more hardware devices.

2. The computer-implemented method according to claim 1, wherein the request is stored in a memory of the user device prior to being entered into the change record database.

3. The computer-implemented method according to claim 1, wherein the request is stored in a memory of the server prior to being entered into the change record database.

4. The computer-implemented method according to claim 1, further comprising receiving a second request to add or modify a second change from a second user device; and
    automatically updating the change calendar and instructing the user device and the second user device to display the change calendar by reconfiguring the plurality of calendar blocks according to the second request.

5. The computer-implemented method according to claim 1, further comprising comparing the plurality of calendar blocks; and, in response to determining that a first and second of the plurality of calendar blocks is matching, combining the first and second calendar blocks and instructing the user device to display a single calendar block including information from both of the first and second of the plurality of calendar blocks.

6. The computer-implemented method according to claim 1, wherein the request to add or modify the change cannot be completed when the conflict is present.

7. The computer-implemented method according to claim 1, wherein the request to add or modify the change corresponds to a change in a plurality of retail stores in the network of retail stores.

8. A system, comprising:
    a server including one or more processors and a database, wherein the database includes change record information and store information for one or more retail stores in a network of retail stores,
    wherein the server includes an electronic change manager that makes a graphical user interface (GUI) available for display on a display of a user device via a network, wherein the electronic change manager receives, from the user device, a store identifier, the store identifier indicating one or more retail stores in the network of retail stores to be impacted via the electronic change manager; sends to the user device instructions to display a change calendar including a plurality of calendar blocks, the plurality of calendar blocks representing changes for the one or more retail stores in the network of retail stores, based on the store identifier received from the user device; receives, from the user device, a request to add or modify a change, wherein the change includes a modification to one or more hardware devices that is an information technology resource at the one or more retail stores and/or a modification to software running on the one or more hardware device; stores the change into a change record database that includes information related to a type of change being implemented, a time at which the change is being implemented, and the store identifier indicating which of the network of retail stores are to be impacted by the change; determines whether there is a conflict between the change and one or more other change records for the one or more retail stores in the network of retail stores by determining whether the change and at least one of the one or more other change records are concurrently scheduled at a location; selects between a no conflict indicator, a conflict indicator, and a matching indicator that the change matches at least one of the one or more change records; automatically updates and sends to the user device instructions to display the change calendar by reconfiguring the plurality of calendar blocks according to the request and automatically updates and sends to the user device instructions to display a change conflict summary including the change with at least one of the no conflict indicator, the conflict indicator, and the matching indicator, wherein the change calendar and the change conflict summary are concurrently displayed on the user device with the change conflict summary being displayed adjacent to the change calendar, and wherein the electronic change manager is stored on the server accessible from the user device via a network; automatically updates the change calendar displayed on the user device based on receiving a modification of the change in the change conflict summary, and automatically updates the change conflict summary displayed on the user device based on receiving the modification of the change in the change calendar; and implements the change in an appropriate order and at an appropriate time based on the updated change calendar to:
  the one or more hardware devices that is an information technology resource at the one or more retail stores and/or
  to the software running on the one or more hardware devices.

9. The system of claim 8, wherein the server is in communication with a plurality of user devices via the network.

10. The system of claim 8, wherein the server receives a second request from one of a plurality of user devices to add or modify a second change; and the electronic change manager automatically updates the change calendar and sends instructions to the plurality of user devices to display the change calendar by reconfiguring the plurality of calendar blocks according to the second request.

11. The system of claim 8, wherein the electronic change manager, in response to determining that a first and second of the plurality of calendar blocks is matching, combines the first and second calendar blocks and sends instructions to a plurality of user devices to display a single calendar block including information from both of the first and second of the plurality of calendar blocks.

12. An electronic change manager interface, comprising:
  a computer device that includes one or more processors and one or more non-transitory tangible computer-readable media programmed with program instructions which, when the program instructions are executed, causes the computer device to display an electronic change manager user interface, the electronic change manager user interface including inputs for completion by a user, the inputs including a store identifier that identifies one or more retail stores in a network of retail stores for which to display an electronic change calendar, the electronic change calendar including a plurality of calendar blocks, the calendar blocks representing changes for the one or more retail stores in the network of retail stores, when the inputs are received from the computer device identifying a request to add or modify a change, wherein the change includes a modification to one or more hardware devices that is an information technology resource at the one or more retail stores and/or a modification to software running on the one or more hardware device, sends the change to a server for storage into a change record database that includes information related to a type of change being implemented, a time at which the change is being implemented, and a store identifier indicating which of the network of retail stores are to be impacted by the change, the electronic change manager user interface is automatically updated and displays the change calendar by reconfiguring the plurality of calendar blocks according to the request and concurrently displays a change conflict summary adjacent to the change calendar, wherein the change conflict summary includes change information of the change with at least one of a no conflict indicator, a conflict indicator, and a matching indicator based on the server determining whether there is a conflict between the change and one or more other change records for the one or more retail stores in the network of retail stores by determining whether the change and at least one of the one or more other change records are concurrently scheduled at a location, and wherein the matching indicator indicates the change matches at least one of the one or more change records, the electronic change manager user interface automatically updates the change calendar displayed on the user device based on receiving a modification of the change in the change conflict summary, automatically updates the change conflict summary displayed on the user device based on receiving the modification of the change in the change calendar, and implements the change in an appropriate order and at an appropriate time based on the updated change calendar to:
  the one or more hardware devices that is an information technology resource at the one or more retail stores and/or
  to the software running on the one or more hardware devices.

13. The electronic change manager interface according to claim 12, wherein the no conflict indicator, the conflict indicator, and the matching indicator is a color coding.

14. The electronic change manager interface according to claim 12, wherein the request is stored in a memory of the computer device prior to submitting the request to the change record database.

15. The electronic change manager interface according to claim 12, wherein the electronic change calendar is updated in response to receiving a second request from another computer device.

16. The electronic change manager interface according to claim 12, wherein the request to add or modify a change is submitted to the server even when a conflict is present.

17. The electronic change manager interface according to claim 12, wherein the request to add or modify the change cannot be completed when a conflict is present.

18. The electronic change manager interface according to claim 12, wherein the electronic change calendar is displayed in a read-only mode.

19. The computer-implemented method according to claim 1, further comprising, prior to storing the change into the change record database, the electronic change manager instructing the change to be stored in a local memory of the user device and displaying a change commit button; and storing the change into the change record database upon receiving an instruction from the user via the change commit button.

20. The computer-implemented method according to claim 1, further comprising the electronic change manager providing a change controller displayed on the user device adjacent to the change calendar, wherein the change controller includes a search control with a search input to search for a particular change from the one or more other change records, a change modifier with a change input to begin creating the change or modifying one of the one or more other change records, and a history display that displays a listing of recently completed actions.

* * * * *